US011935001B2

(12) United States Patent
Lankheet et al.

(10) Patent No.: US 11,935,001 B2
(45) Date of Patent: Mar. 19, 2024

(54) COMPUTER AIDED DESIGN ASSEMBLY PART SCRAPING (71) Applicant: McMaster-Carr Supply Company, Elmhurst, IL (US)

(72) Inventors: Travis Lankheet, Chicago, IL (US); Kiki Rohde, Chicago, IL (US); Will Martin, Glen Ellyn, IL (US); Mrunil Champaneri, Oak Park, IL (US)

(73) Assignee: MCMASTER-CARR SUPPLY COMPANY, Elmhurst, IL (US)

( * ) Notice: Subject to any disclaimer, the term of this patent is extended or adjusted under 35 U.S.C. 154(b) by 63 days.

(21) Appl. No.: 17/716,179

(22) Filed: Apr. 8, 2022

(65) Prior Publication Data
US 2023/0325770 A1 Oct. 12, 2023

(51) Int. Cl.
*G06Q 10/0875* (2023.01)
*G06Q 30/06* (2023.01)
*G06Q 30/0601* (2023.01)

(52) U.S. Cl.
CPC ..... *G06Q 10/0875* (2013.01); *G06Q 30/0605* (2013.01); *G06Q 30/0633* (2013.01)

(58) Field of Classification Search
None
See application file for complete search history.

(56) References Cited

U.S. PATENT DOCUMENTS

| 5,388,318 | A  | * | 2/1995 | Petta | B27M 3/0013 |
| | | | | | 29/897.31 |
| 6,587,094 | B2 | * | 7/2003 | Anderson | G06F 3/0202 |
| | | | | | 345/156 |
| 8,116,529 | B2 | * | 2/2012 | Edwards | G06F 16/5838 |
| | | | | | 382/104 |
| 9,830,638 | B2 | * | 11/2017 | Ruckart | G06Q 30/0639 |
| 10,600,114 | B2 | * | 3/2020 | Westphal | G06Q 30/0641 |

(Continued)

OTHER PUBLICATIONS

Anon., "CAD-based system improves quote speed, accuracy for piping design," Air Conditioning, Heating & Refrigeration News, 179.n7: p88(2). BNP Media. Feb. 12, 1990. (Year: 1990).*

(Continued)

*Primary Examiner* — Nicholas D Rosen
(74) *Attorney, Agent, or Firm* — ArentFox Schiff LLP (57) ABSTRACT

Disclosed herein are system, method, and computer program product embodiments for Computer-Aided Design (CAD) system add-ins configured to receive a CAD file of an assembly drawing, analyze the CAD file to extract part components located within the assembly drawing and add the extracted part components to a part component list of the assembly drawing. The system subsequently filters, based on a set of vendors sourcing the extracted part components, the part component list to identify specific vendors sourcing one or more of the part components or equivalent part components and determines availability of the part components for each of the identified specific vendors. The system subsequently generates, based on the availability of the part components, vendor-specific part component lists for each vendor with the availability, converts the vendor-specific part component lists to purchase orders and communicates the purchase orders to a corresponding one of the vendors.

20 Claims, 7 Drawing Sheets (56) References Cited

U.S. PATENT DOCUMENTS

| | | | |
|---|---|---|---|
| 10,713,039 B2* | 7/2020 | Gupta | G06F 8/76 |
| 11,210,116 B2* | 12/2021 | Kotikalapudi | G06F 3/048 |
| 2002/0067343 A1* | 6/2002 | Anderson | G06F 3/0202 |
| | | | 345/168 |
| 2002/0069115 A1* | 6/2002 | Fitzpatrick | G06Q 30/02 |
| | | | 705/26.8 |
| 2010/0223163 A1* | 9/2010 | Edwards | G06F 16/5838 |
| | | | 705/29 |
| 2012/0064288 A1* | 3/2012 | Nakano | A61L 27/06 |
| | | | 427/532 |
| 2014/0136152 A1* | 5/2014 | Chidiac | G06Q 10/0875 |
| | | | 703/1 |
| 2014/0136155 A1* | 5/2014 | Chidiac | G06Q 10/0875 |
| | | | 703/1 |
| 2014/0156450 A1* | 6/2014 | Ruckart | G06Q 30/0639 |
| | | | 705/26.8 |
| 2016/0300295 A1* | 10/2016 | Westphal | G06Q 30/0633 |
| 2018/0068370 A1* | 3/2018 | Allen | G06Q 30/0627 |
| 2018/0103004 A1* | 4/2018 | Demir | H04L 51/52 |
| 2019/0339968 A1* | 11/2019 | Gupta | G06F 8/30 |
| 2020/0050942 A1* | 2/2020 | Sun | G06F 40/40 |
| 2021/0026662 A1* | 1/2021 | Kotikalapudi | G06F 3/0482 |
| 2022/0101526 A1* | 3/2022 | Lerch | G16H 40/40 |
| 2023/0106653 A1* | 4/2023 | Honnavalli | G06Q 30/0201 |
| | | | 705/26.7 |

OTHER PUBLICATIONS

Zhong, Y., "Automatically generating assembly sequences with an ontology-based approach," Assembly Automation 40.2: 319-334. Emerald Group Publishing Limited. 2020. (Year: 2020).*

* cited by examiner

Vendor 1 – Bill of materials

| Part | | Parts per Assembly | Parts needed | Parts per Package | Packages needed | Total Cost |
|---|---|---|---|---|---|---|
|  | Flanged Socket Head Screw M12x1.75mm Thread, 50mm Length 92235A425 | 50 | 250 | 25 | 10 | Cost 1 |
|  | Zinc-plated Steel Washer For M10 Screw, 10.5 mm ID, 20mm OD 91166A280 | 50 | 250 | 22 | 12 | Cost 2 |
|  | Bearing 30.5 mm ID, 80mm OD 92345A367 | 10 | 50 | 2 | 25 | Cost 3 |

| Assemblies Needed |
|---|
| 5 |

602

Vendor 2 (Custom Parts) – Bill of materials

|  Double -- V Channel 1 inch x 4 inch 900050 -Custom | X | 20' | / | 10 length | X | 2 | = | Cost TBD |

COMPUTER AIDED DESIGN ASSEMBLY PART SCRAPING

BACKGROUND

Computer-Aided Design (CAD) is the use of computers (or workstations) to aid in the creation, modification, analysis, or optimization of a design. This software is often used to increase the productivity of a designer, improve the quality of design, improve communications through documentation, and to create a database for manufacturing. CAD output is often in the form of electronic files for print, machining, or other manufacturing operations. However, complex mechanical designs may integrate many different parts made of differing materials, differing manufacturing requirements, sourced by different vendors, or even ones that require custom fabrication. Lacking with these types of CAD designs is a system or method to automatically recognize requirements of these different components.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for automated part scraping in a CAD environment.

In some embodiments, the technology disclosed herein provides a framework that utilizes extraction models to extract specific parts found within a CAD drawing of an assembly. CAD drawings may include a computer-generated image of a design, its dimensions, processes and materials. These drawings may be either two dimensional (2D) or three-dimensional (3D). When an object is drawn in 3D using CAD, the process is often referred to as rendering or modeling, while 2D design is often called "drafting."

In some embodiments, the technology disclosed herein provides a framework that utilizes extraction models to highlight specific parts found within a CAD drawing of an assembly.

In some embodiments, the technology disclosed herein provides a framework that utilizes extraction models to highlight specific parts for a specific vendor sourcing parts located within a CAD drawing of an assembly.

In some embodiments, the technology disclosed herein integrates an 'Add-In' that runs inside a customer's CAD design application (e.g., SolidWorks), identifies a specific vendor's products in the designs, and automatically creates orders for those products.

In some embodiments, the technology disclosed herein identifies specific vendor products even if they have been updated or modified by their customers.

In some embodiments, the technology disclosed herein converts product counts into orderable quantities. For example, if a vendor sells some products in packs (e.g., a pack of 50 screws) a conversion is needed to go from 'there are 30 screws in this design' to 'order one pack of 50'.

Throughout the descriptions, the terms "part(s)", "part component(s)", "component(s)" or "product(s)" may be interchangeably used without departing from the scope of the technology described herein.

Figure 1:
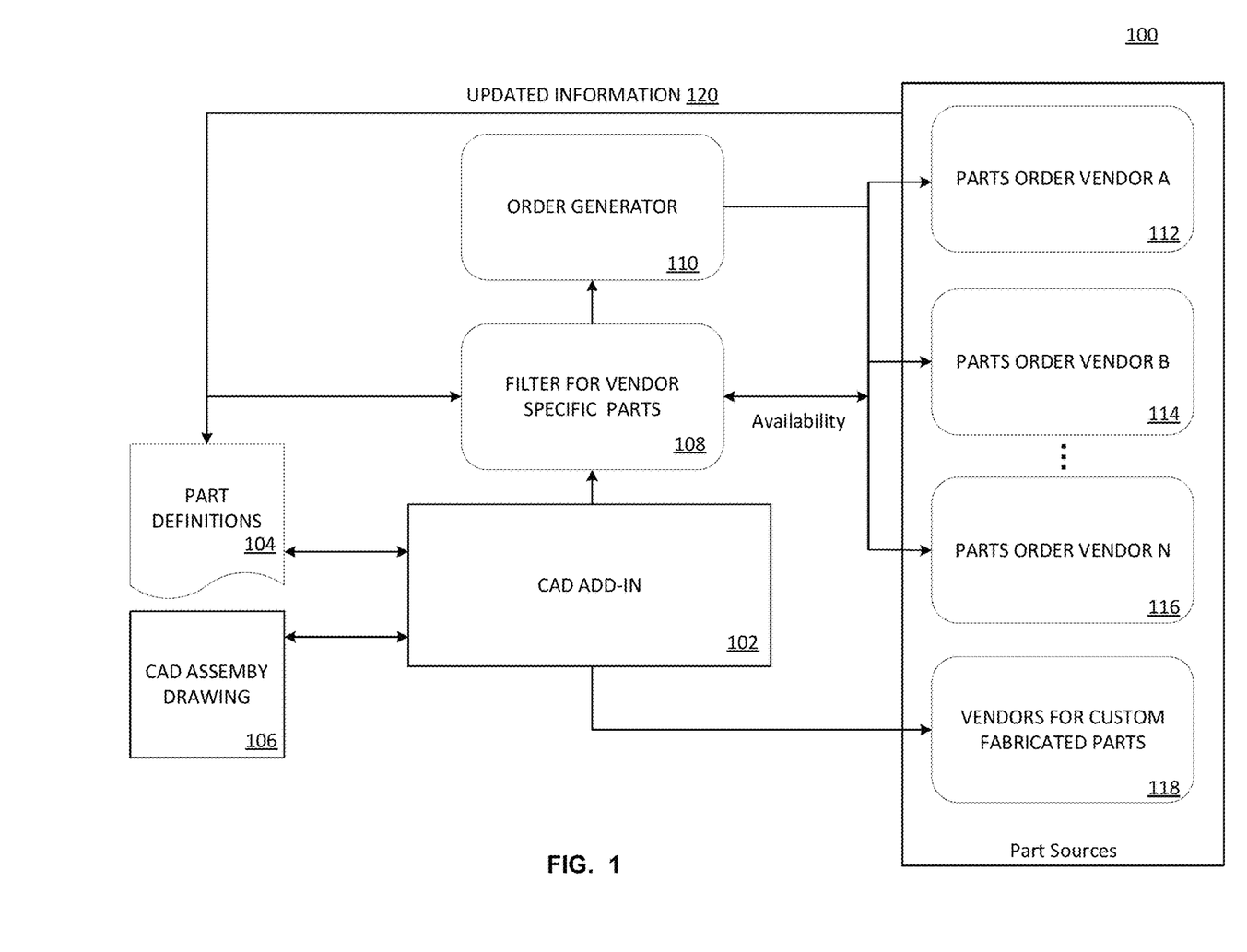
FIG. 1 is a block diagram for a CAD parts scraping system, according to some embodiments.

FIG. 1 is a block diagram for processing a CAD assembly, according to some embodiments. System 100 may be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. One or more processes of the technology described herein may be performed within a CAD add-in. Further, some of the processes described may be performed simultaneously, or in a different order or arrangement than shown in FIG. 1, as will be understood by a person of ordinary skill in the art.

System 100 shall be described with reference to FIG. 1. However, system 100 is not limited to this example embodiment. In addition, system 100 will be described at a high level to provide an overall understanding of one example flow from CAD assembly design to ordered parts. Greater detail will be provided in the figures that follow.

An add-in, also called a plug-in, an add-on, etc., enhances an existing application with new features. Common CAD add-ins perform, but are not limited to, one or more of the following functions: checking for potential dimension errors, checking for potential drawing errors, comparing entities in two drawings and returning differences between them, quick find and zoom, switching off all layers except a currently active layer, writing notes, comments or ideas inside a drawing .dwg file, to name a few. Typically, add-ins are added to software through customization. In some of the embodiments described herein, one or more add-ins are implemented to enhance CAD software by improving its features.

CAD Assembly 106 is an illustration of a product's assembly process. CAD assembly are generated by computer programs and provide detailed information about the assembly of components in a systematic manner. Assembly drawings may include instructions, dimensions, reference numbers, references to detail drawings or shop drawings, and specification information. An assembly tree, displays a plurality of assemblies and sub-assemblies of solid materials in the CAD Assembly 106. Each assembly tree captures relationships between assemblies or sub-assemblies. In addition, each assembly or sub-assembly contains all of its components and the relationships between these components.

Once an instance of a CAD Assembly 106 is opened in a CAD program, a CAD add-in 102 will scrape (i.e., extract) or scan part components in the assembly tree and look, from a set of vendors sourcing the extracted parts, for components that follow specific vendor part number naming conventions or schemes. For example, a specific vendor part number name scheme may include any of a number of letters, digits, punctuation marks, etc. A few examples include, but are not limited to, 3014T45 or 3687N117. The CAD add-in 102 identifies a component as a vendor-specific part number by scanning one or more of CAD Assembly 106 filename, configuration names, or parts definitions. The configuration names (e.g., rail assembly) or parts definitions may be searched in parts definitions 104. Definitions include, but are not limited to, general description (e.g., washer), intended use (for M10 screw), dimensions (e.g., 10.5 mm ID (inside diameter), 20 mm OD (outside diameter)), materials (e.g., zinc-plated steel), and known part numbers from one or more vendors, etc. One skilled in the art will appreciate that the part definitions 104 (also termed "part component definitions") may include any information or data (e.g., text, numbers, symbols, imagery, video, hypertext links, etc.) needed to accurately identify the part.

In some embodiments, system 100 further includes a continuous or scheduled review of part definitions 104 to determine an accuracy of these descriptions. For example, a "health-check" of the part definitions 104 may include eliminating discontinued parts, adding new or replacement parts and their corresponding definitions or updating parts definitions, to name a few. For example, Vendor 1 modifies their parts description to include a new carbon fiber version of an original part. In another example, Vendor 2 modifies their parts description based on added or eliminated specific sizes. In another example, Vendor 3 no longer manufactures a part and the definitions are updated to reflect this. In yet another example, part definitions may be added, removed, revised, etc. for non-standard parts that may be sourced as custom-made parts from various vendors (e.g., metal works or fabricators). These updates may be automatically pushed to the system as updated information 120 or updated in a request from the CAD add-in 102. While updates may be made to any component in the system, one approach is to regularly update the part definitions 104 and vendor lists as used in a vendor-specific selection process as described in greater detail hereafter. In one non-limiting example, if a vendor no longer manufactures a part, the part definitions and vendor list for that part may be updated. In a second non-limiting example, if a vendor goes out of business, their parts would be purged from the part definitions and from the vendor lists. In another non-limiting example, a vendor may become approved or certified to provide, for example, a military grade part and this information may be updated in the part definitions and vendor list.

Once the components (parts) are scraped from the CAD assembly, one or more part numbers identify them. Using known vendor part naming schemes, a filter for vendor specific parts 108, will automatically separate (i.e., extract) the various parts into vendor-specific part component lists. In some embodiments, multiple part numbers may be provided by part definitions 104 to reflect specific part numbers for the same part, but sourced by different vendors. In some embodiments, a check is first made to determine if the product is discontinued or out of stock. If not available, the system recommends, based on equivalent part definitions 104, a different vendor, replacement product or another part number from a different vendor. One skilled in the art will appreciate that other approaches may be substituted without departing from the scope of the technology described herein. For example, a machine-learning model may be trained to recognize and aggregate parts into vendor specific part component lists.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning). Machine learning engine may use various classifiers to map concepts associated with specific part component structures to capture relationships between concepts and words/phrases/sentences. For example, three vendors may source the same part, but provide different part definitions and more or less ancillary information (e.g., dimensions, materials, coatings, etc.). The classifier (discriminator) is trained to distinguish (recognize) variations. For example, a trained machine-learning model may implement a first classifier to classify part definitions of the part components and a second classifier to classify the part components based on the classified part definitions. Different variations may be classified to ensure no collapse of the classifier and so that variations can be distinguished.

In one example embodiment, a machine learning model may be trained to recognize or predict a part after being trained by one or more training sets. For example, a first training set may be built with a plurality of part definitions to include, but not be limited to, textual descriptions, dimensions, total weight, materials, coatings, standards requirements (e.g., military grade), quality metrics, manufacturing processes or requirements, thermal properties, magnetic properties, or electrical properties, etc. The trained machine model may subsequently provide a prediction of a correct part with X percentage of accuracy (e.g., 90%). Additional training, manual correction, revised weighting of elements of the model (e.g., dimensions are weighted as more important than materials in the learning process) or feedback from an output of the model to the machine learning engine, may improve the accuracy of subsequent predictions.

Alternatively, or in addition to, a machine learning model may be trained to recognize or predict a part from one or more visual cues (e.g., shape or geometry). In one non-limiting example, a series of images of known parts may be fed to the machine learning engine as a training set. For example, a training set may include a series of images of parts from different manufactures, vendors, angles, sides, magnifications, lighting, or resolutions, to name a few. In a supervised learning embodiment, all images belonging to a same part may be associated with that part. Alternately, the machine learning training process may be unsupervised. Unsupervised learning algorithms take a set of data that contains only inputs, and find structure in the data, like grouping or clustering of data points. The algorithms, therefore, learn from training data that has not been labeled, classified or categorized. Instead of responding to feedback, unsupervised learning algorithms identify commonalities in the data and react based on the presence or absence of such commonalities in each new piece of data. While described for supervised and unsupervised learning processes, any known or future machine learning process may be substituted without departing from the scope of the technology described herein. In addition, while described for single parts, assemblies or systems containing a plurality of parts may be recognized and identified using any of the methods described herein. Alternatively, or in addition to, the machine learning process may identify vendor specific parts, identify parts sourced by multiple vendors, identify equivalents, or identify custom fabricated parts.

In addition, while described for images, alternatively, 2D and 3D CAD drawing files of single parts or groupings of parts (e.g., assemblies) may be used as a training set. Also, while described herein for specific training sets, the training sets may include more or less data fields or be aggregated into larger sets (e.g., part definitions plus images) without departing form the scope of the technology described herein.

While described as a machine learning model to recognize or predict a part from one or more visual cues (e.g., shape or geometry), other algorithmic-based approaches may be substituted without departing from the scope described herein. For example, a 3D point-cloud matching algorithm may be used to ascertain shape or geometry of a part or assembly. Known or future 3D point-cloud matching approaches may be substituted without departing from the scope of the technology described herein.

In another example, a Natural Language Processor (NLP) may be implemented to recognize and aggregate parts into vendor specific part component lists. A NLP interface may serve as an entry point or user interface through which one or more words/sentences (parts), may be entered for subsequent recognition using an automatic parts recognition model. In certain embodiments, the interface may facilitate information exchange among and between a NLP and one or more parts modules and/or systems. The NLP may be implemented by one or more software, hardware, and/or firmware components and may include one or more logical components, processes, algorithms, systems, applications, and/or networks. Certain functions embodied by the NLP may be implemented by, for example, HTML, HTML with JavaScript, C/C++, Java, etc.

In certain configurations, the NLP may interact with one or more CAD applications running on one or more computer systems. For example, NLP may embed functionality associated with components of NLP into applications running on system 100. In one example, the NLP may embed NLP functionality into a Web browser or interactive menu application with which a user (parts purchaser) interacts.

In certain embodiments, the NLP may include, be coupled to, and/or integrate one or more systems and/or applications, such as parts recognition facilities and Text-To-Parts (TTP) engines. For example, the NLP may analyze text of part definitions and determine contextual relationships between the part definitions and the extracted part components. Further, the NLP may serve as an entry point to one or more text portals. Such a text portal may include software and hardware for receiving and processing instructions from a user via text. The text portal may include, for example, a text recognition function and an associated application server. Consistent with embodiments of the present technology described herein, NLP may receive natural language queries (e.g., word, phrases or sentences) from a CAD application and forward the queries to a semantic analyzer to recognize relationships between parts, parts definitions and vendor-specific information.

Figure 6:
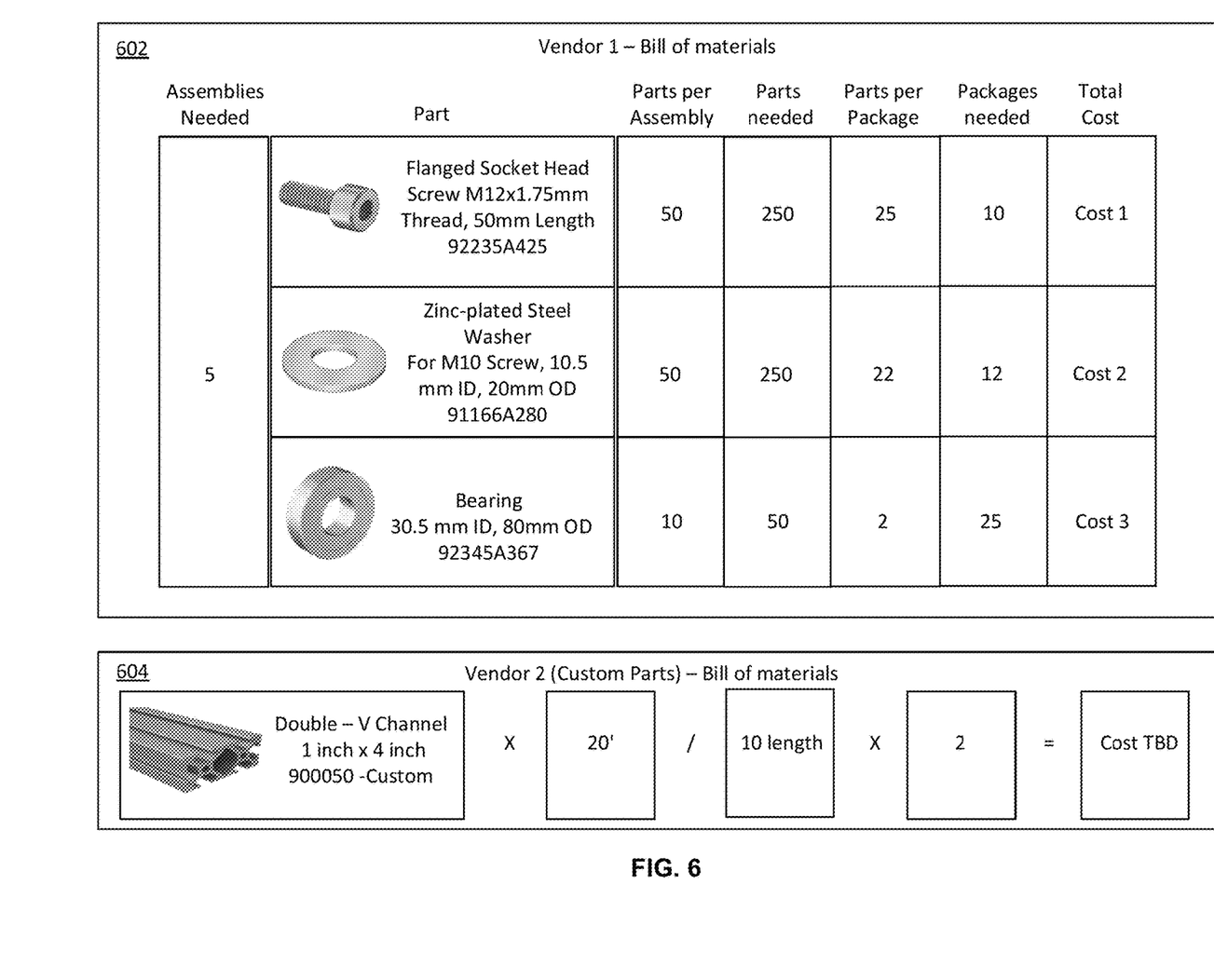
FIG. 6 illustrates an example bill of materials, as per some embodiments.

In some embodiments, Order Generator 110 may be part of CAD add-in 102, an additional add-in, or be a separate computer component (e.g. server-based, web-based, cloud-based, etc.) to organize vendor specific purchase orders, such as shown and further described in association with FIG. 6. A parts order may, in some embodiments, pull the parts definition information for each part identified during the scraping of the CAD assembly 106. The scraping will identify the parts needed to assemble the assembly, the quantities, sizes, materials, etc. The filter for vendor specific parts will aggregate this information into vendor-specific component lists 112, 114, 116, etc. In some embodiments, the purchaser may also choose a specific vendor for parts based on pricing, existing contracts or relationships, volume or availability, to name a few. For example, the order generator may include a "when needed" input to determine which vendors can deliver the parts needed in the needed time frame.

While described as part of the order generator 110, the same or at least a part of this filtering functionality may be instantiated in the filter for specific vendor parts 108. Alternatively, or in addition to, the filter for vendor specific parts 108 may include "all" vendors that can provide (i.e., source) the needed part. For example, when the CAD assembly was designed, a first vendor's part may have been selected, but subsequently the system would allow this part to be swapped out for a new or preferred vendor equivalent part based on cost, contract, relationships, or availability, to name a few.

While shown as a separate process workflow, custom fabricated parts may also be processed by the order generator, for example, to be filtered by the filter for specific vendor parts 108. The vendor list may include various vendors for custom fabricated parts 118 and the parts, category of parts or materials that they may fabricate. For example, parts that are one-offs, infrequently used, very heavy, made from geographic sourced materials (e.g., rare earth metals), or may need to be sourced locally to reduce costs and fabrication times are ordered through vendors for custom fabricated parts 118. Even though these custom parts may not have a specific part number, they may have a category or materials part number. For example, part number 900050 may refer to custom fabricated steel channels. In another example, part number CF10000 may reference carbon fiber materials. Subsequently, purchase orders may be generated for one or more fabricators of specific carbon fiber products according to their parts descriptions, sizing, etc.

In some embodiments, multiple purchase orders may be generated for a same part, with the purchaser making a final selection. For example, in an exemplary embodiment, the add-in will create a plurality of Bill of Materials (BoM) for scraped part numbers. See FIG. 6 for example calculated Bill of Materials. In some embodiments, customers pick a number of assemblies that they want to purchase parts for. For example, if they want to purchase five assemblies, the generated bill of materials part components will be multiplied by five.

In some embodiments, each time a part component is added or removed from the drawing assembly, the identification of a part component and generating of a bill of materials is performed in real-time. This process also may be performed in batch format by scraping a final assembly design.

In some embodiments, the bill of materials quantities are converted to order quantities with respect to vendor designated packaging quantities. For example, in FIG. 6 we see in the first line that the assembly requires 245 flange socket head screws of part number 92235A425. Since this vendor sells this part in a package quantity of 50 (50 pieces/lot), the customer only needs to order five packs (lots), rather than the bill of material quantity of 245. This automatic conversion saves the customer significant time by not needing to convert quantities for each component in the bill of materials.

In an example purchase order processing sequence, when the customer is ready to order vendor-specific parts for the assembly, they can select "Preview order". This preview request will send the purchase orders with a corresponding bill of materials to vendor-specific servers and convert the purchase orders to a saved order. When the customer is ready to complete the order, they can select "Open order" in the CAD add-in 102 and they will be directed to, for example, "vendor-specific.com" for a specific vendor where the purchaser can finalize the purchase. In some embodiments, the saved order they were viewing in the add-in will automatically surface in their web browser as a hyperlink and they can then validate the shipping and payment information.

Figure 2:
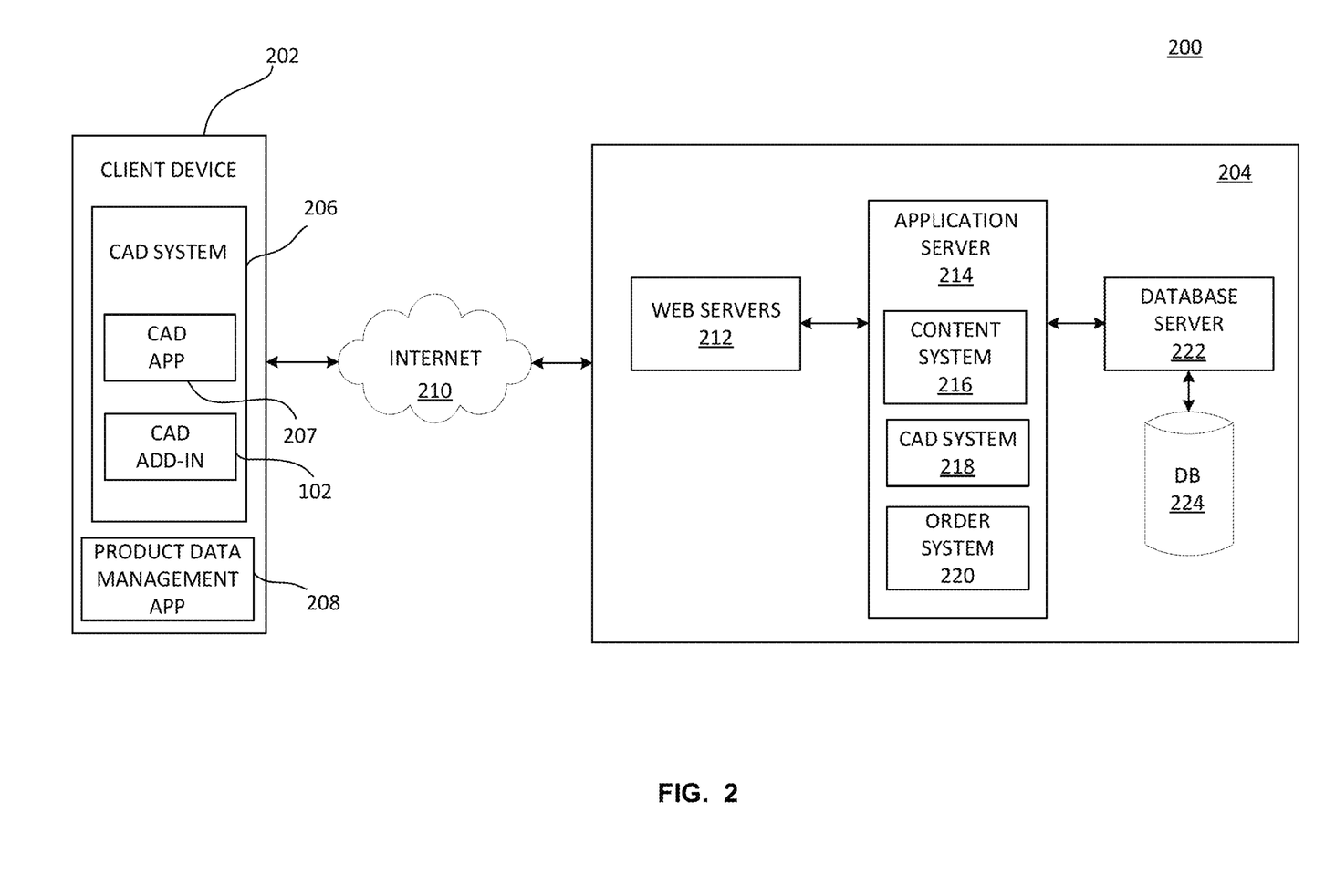
FIG. 2 is a system diagram for CAD parts scraping, according to some embodiments.

FIG. 2 illustrates an example system 200 processing a CAD vendor parts order, as per some embodiments. System 200 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 2, as will be understood by a person of ordinary skill in the art.

System 200 shall be described with reference to FIG. 2. However, system 200 is not limited to this example embodiment. In addition, system 200 will be described at a high level to provide an overall understanding of one example part scraping and ordering system. Greater detail will be provided in the figures that follow.

The present technology described herein relates to a system 200 that identifies CAD part components in a CAD assembly as products that can be sourced to specific vendors, determines if the product is discontinued or out of stock and generates the specific bill of sales and corresponding purchase orders. In some embodiments, the technology described herein provides the utility of identifying products that are no longer available and sources replacement products that integrate with the assembly drawing design (e.g., CAD assembly 106).

System 200 may include a client side and a server side. For simplicity purposes, the system 200 is illustrated for a single designer/purchaser client and a single vendor server system. However, it would be understood by one skilled in the art that the client and server side systems may be replicated for multiple designers, purchasers or vendors without departing from the scope of the technology described herein. In addition, the following descriptions will be described for example client side (e.g., client device 202) and server side 204 architectures; however, the architectures may vary based on purchaser/vendor specific hardware/software requirements without departing from the scope of the technology disclosed herein. Alternatively, or in addition to, one or more of the processes described may be performed on either the client side or the server side without departing form the scope of the technology described herein.

In some embodiments, Client device 202 may include a CAD system 206, with a CAD application 207 and CAD add-in 102 (see FIG. 1). The CAD add-in 102 scrapes or scans an open assembly instance in the CAD Application 207 and identifies CAD part components (i.e., parts) that can be sourced as products that are commonly fabricated. The CAD add-in 102 sends a request with a list of products to a vendor sourcing the products with a server side 204 platform to check availability via an Internet connection 210 to web servers 212. The web servers 212 then send a list of products to the application server(s) 214 where the order system 220 determines availability and any replacement options. Once availability and replacement options are determined, a response is sent back to the client device 202 with the availability and replacement options for each product identified. These results may be viewable by the purchaser using the CAD add-in 102.

While described for standard parts above, in some instances, no standard parts are available and a required part needs to be custom fabricated. In this embodiment, the CAD add-in 102 scans an open assembly drawing instance in the CAD Application 207 and identifies CAD components that can be sourced as products that are NOT commonly fabricated. The CAD add-in 102 measures these products in the CAD Assembly 106 and sends a CAD file, which may contain one or more products and their corresponding measurements via an Internet connection 210 to web servers 212. The web servers 212 then send the list of products and their measurements to the application server(s) 214 where the CAD system 216 is used to determine, for example, cut lengths of the product. While described for cut lengths, any customized feature of the part may be captured for production including, but not limited to, physical sizes, materials, compositions, special coatings or treatments, special requirements (e.g., military grade materials, specific standards, etc.), to name a few. For example, the system may need to custom-fabricate with an additive manufacturing process based on measurements in a CAD file.

This determination is made possible by the CAD add-in publishing or communicating the CAD file of the assembly-drawing instance to the server side 202. The CAD system 218 records measurement data of the product when the CAD file is published and stores it in database 224, by database server 222. Once the cut lengths are determined, the content system 216 to identifies the product length options for the product (as there may be multiple lengths of the same product that may work better with the cut list). A material optimization algorithm then calculates, given the available product lengths and cost or material considerations, the cut lengths to create a cut list that is optimized to save material (or cost). The cut list is sent back to client device 202 as a response and the CAD add-in 102 displays the cut list with the optimized order quantity.

In some embodiments, the present technology described herein identifies CAD part components in a CAD assembly as products that were previously sourced and determines if the product has an accurate CAD file (e.g., CAD assembly 106). The technology described herein provides the utility of identifying CAD for products that may be inaccurate and notifying the client of the availability of an accurate CAD file to ensure assembly design integrity. The CAD add-in 102 scans an open assembly drawing instance in the CAD Application 207 and identifies CAD components that were previously sourced. The CAD add-in 102 sends a list of products and their revision data via an Internet connection 210 to web servers 212. The web servers 212 sends the list of products and any revision data to the application servers 214 where the CAD system 216 is used to determine if the current CAD data is accurate in representing the product. This determination is possible since the CAD system 218 records previous revision data of a CAD Library of parts data and stores it in database 224. Once the accuracy of the products CAD is determined, the results are sent back to client device 202 as a response and the CAD add-in 102 displays which CAD files are accurate and which ones need to be updated in the assembly. The CAD add-in 102 provides the ability to replace inaccurate CAD components in the assembly. In a non-limiting example, a scraped CAD part indicates a 10 mm inside diameter (ID) for a washer. However, in a previous CAD Assembly 106, this part was correctly identified as a 10.5 mm ID. The system would compare the builds and determine that the newly scraped part size description is an error or may contain an error. The system would then correct the sizing in the CAD Assembly 106. The reverse scenario may also be applicable. For example, a part is described as a first size in an older assembly design, but has been updated by the manufacturer and will need to be updated in all future similar assemblies.

In some embodiments, the CAD add-in 102 scans an open assembly drawing instance in the CAD Application 207 and identifies CAD components that can be sourced as products. The CAD add-in 102 displays the products that were identified in the form of a bill of materials. The client then designates an assembly multiplier to allow them to order quantities to assemble multiple instances of their design (e.g., how many assemblies they would like to purchase) and the CAD add-in is able to generate an order by sending a list of required products and their quantities via an Internet connection 210 to web servers 212. The web servers 212 then send the list of products and their required quantities to the application servers 214 where the content system 216 calculates an order quantity from the package quantity. For example, if the required quantity is 195 for a given product and the content system lists that product to be sold in package quantities of 100, and the client specifies an 'assembly multiplier' of 2, the order quantity would be calculated to 4. Once the order quantities for the requested products are calculated, an order is created in the order system 220 and a response is sent back to the client device 202 with the order created, ready to verify and submit through the CAD add-in 102.

The technology described herein improves the technology associated with CAD systems, at a minimum, by properly extracting correct parts, descriptions, sizing, order quantities, vendor sources, availability and accuracy. In addition, the system provides a framework that unites several components to better assist customers to achieve higher customer satisfaction. The system detects when customers/purchasers need to source parts from a CAD design and provides vendor-specific ordering in real time to improve the customer experience.

Figure 3:
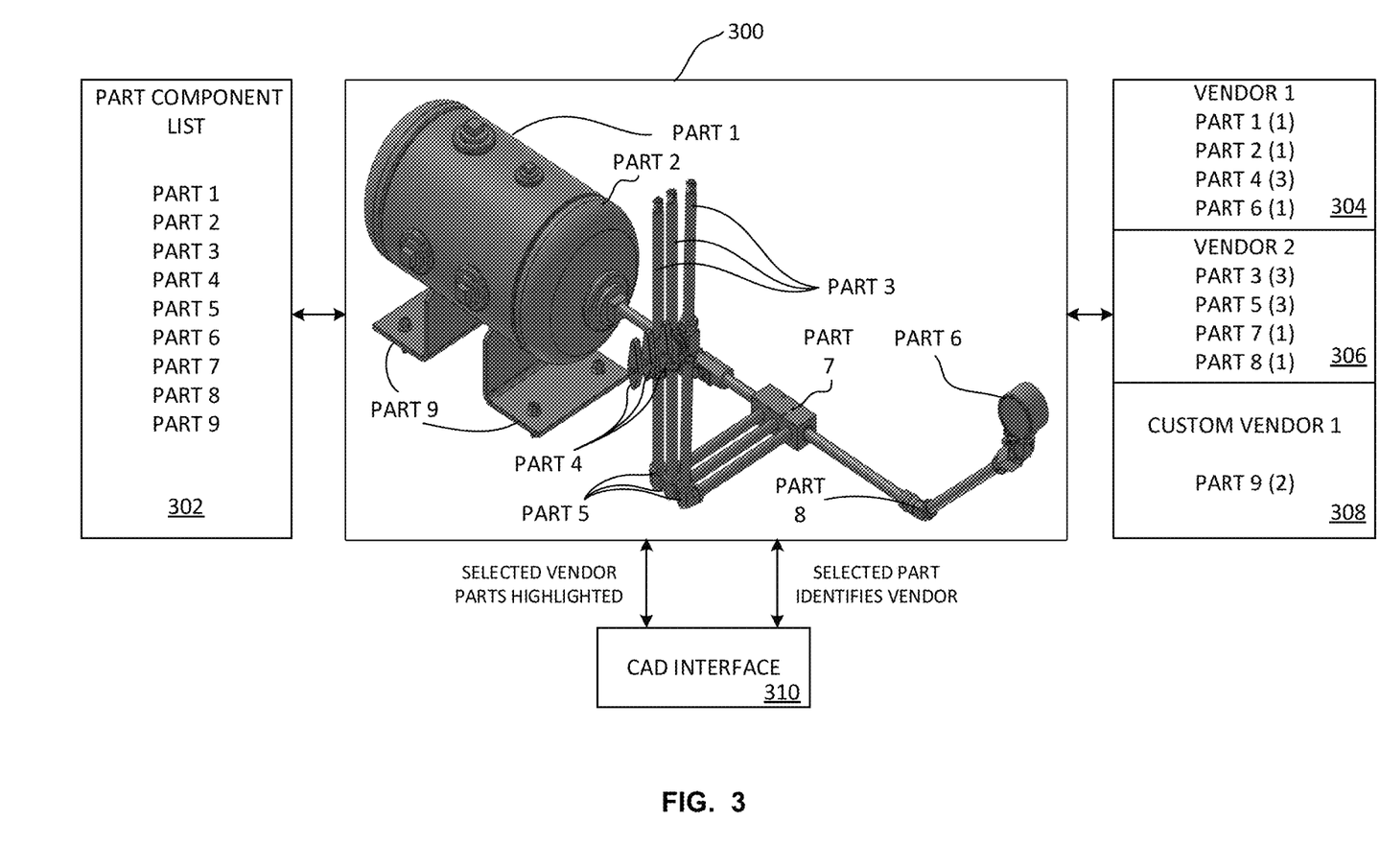
FIG. 3 is an example diagram for processing a CAD assembly, according to some embodiments.

FIG. 3 is an example block diagram for processing of a CAD assembly, according to some embodiments. As shown, a CAD assembly 300 includes an assembly with multiple interconnected parts. For example, the assembly includes parts 1-9, as identified. As previously described, the CAD add-in 102 scrapes or scans the CAD assembly to extract and identify these specific parts, measurements, accuracy, vendor-specific sources, availability, order quantities and costs, to name a few. The scraping can add each part to the part component list 302 as identified in real time, or in a batch process. For example, the part component list may add a part individually as the part is added to the design or at completion of the design phase. In addition, the designer or purchaser may use CAD Interface 310 to select any part and the part will be highlighted in the CAD assembly 300 (e.g., by color). The selected part may also be highlighted in the part component list 302, may be identified by vendor (e.g., show me all parts by a specific vendor), be highlighted in the vendor-specific parts list or any combination thereof.

As shown, a part component list 302 is aggregated based on the scraping and part definitions. The list can then be broken (i.e., filtered) into one or more vendor-specific part component lists 304, 306 or 308. Vendor 1 list 304 includes parts 1, 2, 4 and 6 with prospective quantities based on building a single assembly. A multiplier of these quantities would be applied for building multiple assemblies. Vendor 2 list 306 includes parts 3, 5, 7 and 8. For simplicity purposes, the specific part numbers, descriptions, sizing, etc. have not been provided in this example. Custom Vendor list 308 identifies part 9, which is not commonly available from vendors 1 or 2 and needs to be fabricated from a custom fabricator as a custom part. The custom vendor list may also include the custom part sizing (e.g., cut sizes), material requirements, and other custom part requirements to allow a fabricator to ascertain a project scope to subsequently provide ad hoc pricing.

Figure 4:
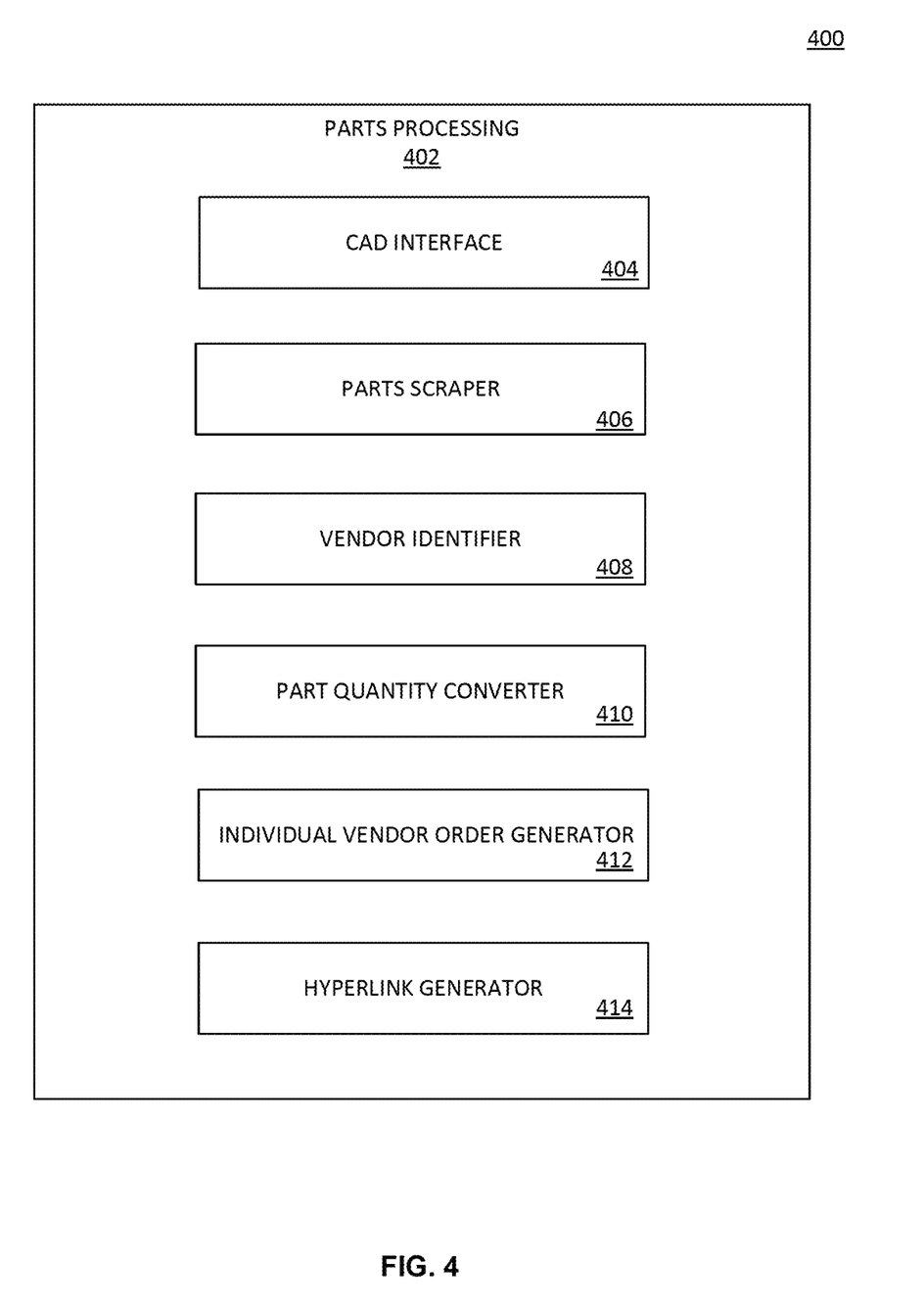
FIG. 4 is a block diagram for processing a CAD vendor parts order, according to some embodiments.

FIG. 4 illustrates an example system 400 processing a CAD vendor parts order, as per some embodiments. System 400 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 4, as will be understood by a person of ordinary skill in the art.

Parts processing system 402 may include a plurality of components to process CAD drawings to parts purchase orders. While specific components are illustrate and described, the technology described herein is not limited thereto. For example, more or less components may be implemented without departing from the scope of the technology disclosed herein. In addition, one or more processes described herein may be combined or performed separated by one or more system components.

CAD interface 404 provides for interacting with one or more of instances of the CAD assembly 106. Interacting may include, but be limited to, designing the assembly, selecting one or more parts in the design for highlighting, extracting parts, updating the drawing or part component lists, reviewing the vendors lists, reviewing the purchase orders, viewing parts descriptions, viewing measurements, viewing results of accuracy determinations, viewing vendor-specific messaging, to name a few.

Parts scraper 406 reviews an instance of the CAD assembly as parts are added or at design completion to extract parts (of one of more vendors), equivalents or determine that a part cannot be identified and recommend a replacement or custom fabrication. The parts scraper 406 may identify the parts based on part definitions 104 or custom requirements. Sizing and quantities needed may be determined from the CAD assembly data. In some embodiments, the parts scraper is implemented by CAD add-in 102. While described for scraping individual parts, the parts scraper may scrape entire assemblies or sub-assemblies from previous designs that are each made up of individual parts. For example, part definitions may aggregate assembly part descriptions and subsequently provide the entire sub-assembly (or entire assembly) part descriptions for future same assemblies or sub-assemblies. In other words, once an assembly or a sub-assembly has been scraped and the part components identified, the results are stored in computer memory of the client side, server side or both, for future use.

Vendor identifier 408 implements vendor-specific filtering to identify or select vendors as sources for each part or custom part. The vendor lists may be live lists with known vendors, future vendors, preferred vendors (e.g., under contract or special pricing), blocked vendors (e.g., do not use), certified vendors (i.e., parts that require certain certifications or standards to be met) or vendors that do not source a needed part, but may be used for future assemblies. In addition, the vendor identifier may identify availability of parts from specific vendors or identify vendors that have a history of missing part fulfillment deadlines (e.g., late in shipping parts). In addition, the vendor identifier may continuously, or by schedule, update parts definition information 120.

Part quantity converter 410 calculates a number of part groupings (packages or lots) to be ordered, based on the number of parts and assemblies, with those parts needed and the packaging constraints of a specific vendor. In some embodiments, the parts quantity converter will identify a second vendor that may save costs or materials by alignment of a number of parts needed with packaging constraints. This alignment may save costs, reduce duplicative part waste and storage of unused parts. Parts quantity converter 410 may also convert cut lengths for custom parts. For example, an assembly needs two 8 ft. sections, but the fabricator manufactures these in 20 ft. lengths. The parts quantity converter 410 would convert two parts to one part or request specific cuts in the needed 8 ft. sections, potentially saving costs and reducing wasted materials.

Individual vendor order generator 412 ingests the parts, descriptions, sizing, quantities, vendors, etc. and automatically generates (e.g., in real-time) one or more vendor-specific purchase orders. In some embodiments, the system generates a purchase order for each vendor sourcing each part and the purchaser may select (e.g., based on cost, contractual commitments, or time to delivery, etc.) which vendor to purchase the parts from. In some embodiments, once a vendor is selected, a hyperlink generator 414 will generate a hyperlink to access a web-based ordering system for each specific vendor chosen.

Figure 5:
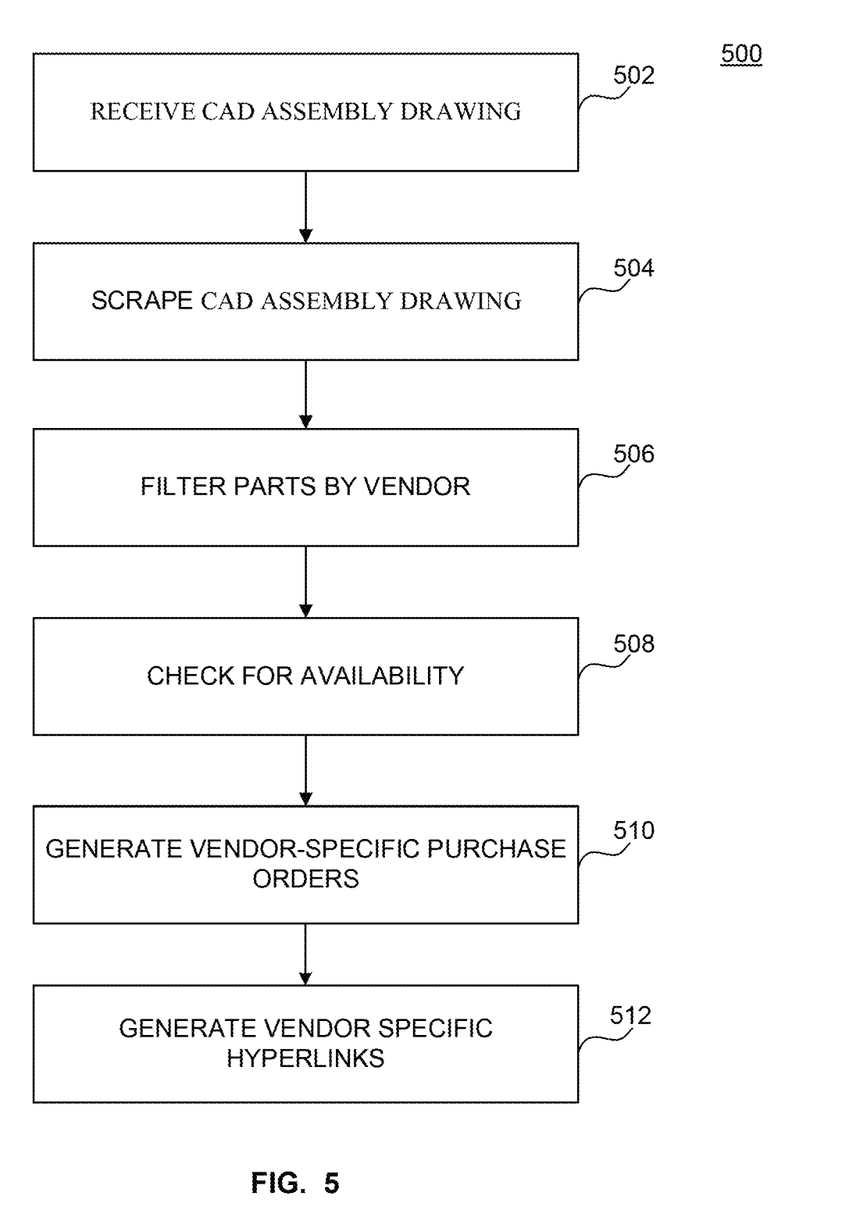
FIG. 5 is a flow diagram for CAD parts scraping, according to some embodiments.

FIG. 5 is a flow diagram for real-time parts processing, according to some embodiments.

In 502, a CAD add-in receives a CAD assembly. The CAD assembly may be in any portion of a design phase. For example, the assembly design may be at an initial phase of design, partially completed, a draft design, final design or in an updated or modified version.

In 504, the CAD add-in scrapes the CAD assembly. For example, each time a part is added to the design, the CAD add-in matches the design part by part number, part definitions or equivalents. The CAD add-in generates a part component list of parts identified in the scraping process. The part component list may include part numbers, part descriptions, quantities needed per assembly, number of assemblies needed, sizing, materials, etc.

In 506, the CAD add-in filters the part component lists by vendor's providing the part or an equivalent part. The filtering may be based on any known or future consideration, such as, but not limited to, existing vendor part naming scheme, previous pricing or orders, contractual obligations, preferred vendors, blocked vendors, historical performance (e.g., providing parts by a requested deadline), geographic location (e.g., local vs. overseas), etc.

In 508, the CAD add-in checks the filtered part component lists for availability, pricing, accuracy of part description (e.g., sizing, materials, etc.), to name a few. For example, if the part is needed in two weeks, which vendors can or have historically provided the needed two-week delivery may be selected from a list of vendors each providing the same or similar part. Custom fabricated parts may need an additional level of filtering and/or processing to determine availability and cost (e.g., may have to be sent out for bid).

In 510, the CAD add-in generates vendor-specific purchase orders with bill of materials including, but not limited to, listed parts, descriptions, sizing, quantities, pricing, time needed, etc. The purchaser may select from one or more vendor lists or move needed parts to another vendor purchase order (e.g., based on pricing or timing), another vendor (e.g., remove a constraint so that a specific vendor may be selected) or add a new vendor not yet in the system. When editing or updating the lists, the process may return to the filtering step and new vendor purchase orders may be generated. In other words, even though the system automatically generates the vendor purchase orders, the purchaser has override or editing capabilities based on their preferences or circumstances.

In 512, purchase orders are converted to browser-based hyperlinks that connect to vendor computer order systems to complete the order. A confirmation, modified purchase order, newly updated information (e.g., new part descriptions, recently out-of-stock, discontinued, new sizing or materials, etc.) or message (e.g., for additional information) may be received from the vendor to update the purchase order, bill of materials and/or the parts definitions 104. Alternatively, or in addition to, the completion of the order may take place within the CAD add-in itself.

FIG. 6 illustrates a purchase order including a bill of materials. As previously described, the present technology described herein relates to a system that identifies CAD components in a CAD assembly as products that can be sourced and creates an order based on the required quantity (e.g., number of assemblies needed). This technology described herein provides the utility of converting required quantity of components into an order quantity with respect to package quantity for the identified product.

The CAD add-in 102 scans an open assembly in the CAD Application 207 and identifies CAD components (parts) that can be sourced as products. The CAD add-in 102 displays the products that were identified in the form of a bill of materials 602 for vendor 1. The client then designates how many assemblies they would like to purchase (shown as 5) and is able to generate a purchase order by sending a file with a list of standard parts (shown as Flanged Socket Head Screw, Zinc-plated Steel Washer and Bearing, etc.) available from a specified vendor (shown as Vendor 1) and their quantities via an Internet connection to web servers. The web servers then sends a file with the list of products and their required quantities to their application servers where a content system may calculate the order quantity from the package quantity. (For example, if the required quantity is 250 for a given product and the content system lists that product to be sold in package quantities of 22 (Zinc-Plated Steel Washer example), the order quantity would be calculated to 12). Once the order quantities for the requested products are calculated, a purchase order is created in the order system and a response is sent back to the client device with the order created and is ready to verify and submit through the CAD add-in 102.

In addition, the present technology described herein relates to a system that identifies CAD components in a CAD assembly as products that can be source and are inherently fabricated (e.g., post purchase). As shown, bill of materials 604 for vendor 2 (custom parts) includes a description, length or lengths needed, vendor cut sizes, and calculation of costs. The system determines how the products are to be fabricated (based on product descriptions, sizing, materials, production methods, standards, etc.) and calculates the required material through developing, for example, a cut list. For example, t-slotted framing and raw materials may be cut/fabricated from an original length. Therefore, instead of needing ten 10' lengths to get ten 1.5' pieces, the CAD add-in may identify that only two 10' lengths are required. This technology described herein provides the utility of identifying products that were fabricated post purchase and creating an order from a cut list to reduce cost and material waste for the client.

Figure 7:
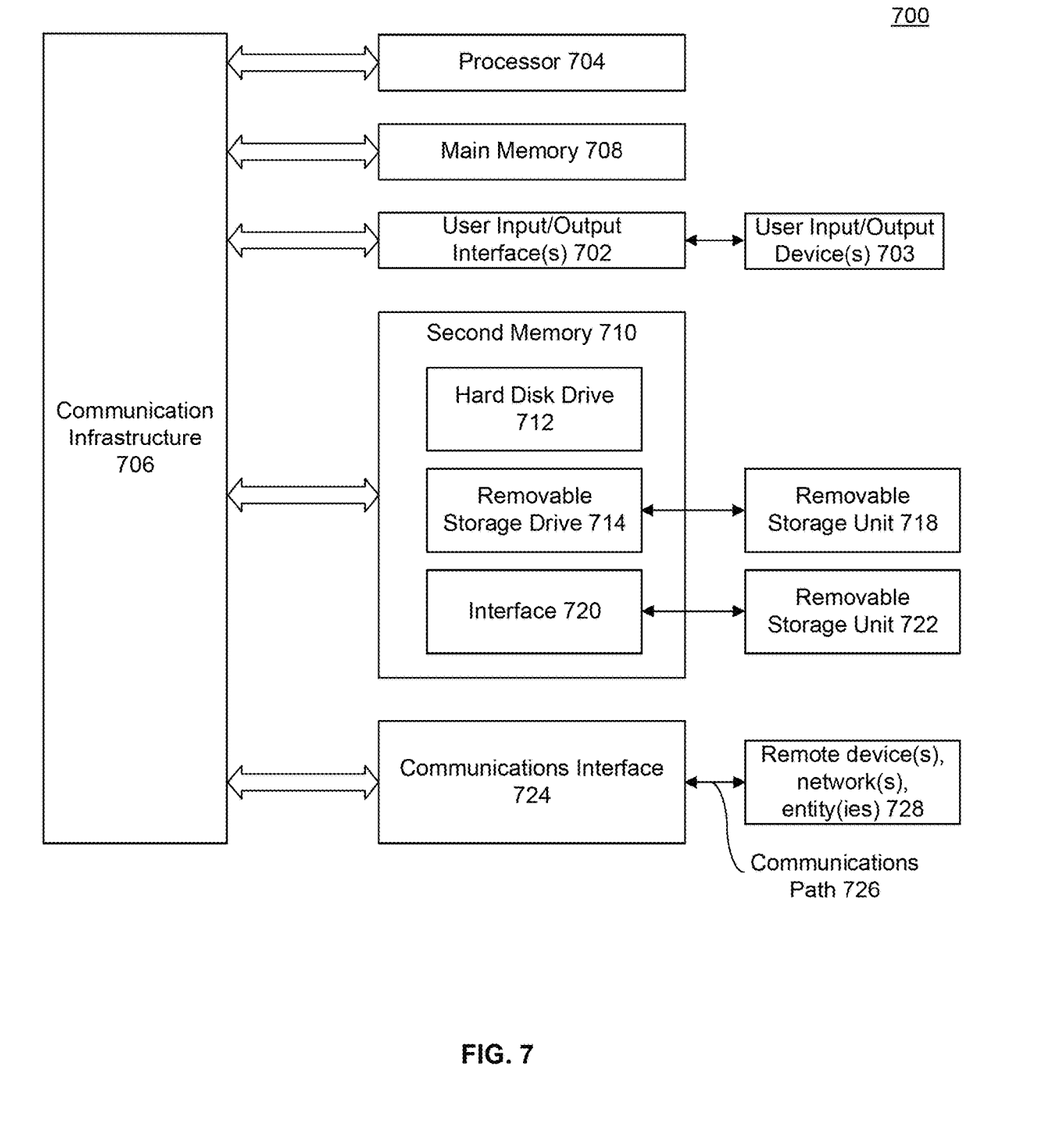
FIG. 7 an example computer system useful for implementing various embodiments.

Various embodiments can be implemented, for example, using one or more computer systems, such as computer system 700 shown in FIG. 7. Computer system 700 can be used, for example, to implement method 500 of FIG. 5. Computer system 700 can be any computer capable of performing the functions described herein. Computer system 700 can be any well-known computer capable of performing the functions described herein.

Computer system 700 includes one or more processors (also central processing units, or CPUs), such as a processor 704. Processor 704 is connected to a communication infrastructure or bus 706.

One or more processors 704 may each be a graphics-processing unit (GPU). In an embodiment, a GPU is a processor that is a specialized electronic circuit designed to process mathematics intensive applications. The GPU may have a parallel structure that is efficient for parallel processing of large blocks of data, such as mathematics intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired, and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system in a Computer-Aided Design (CAD) environment, the system comprising:
 a CAD client device with a CAD design application;
 a CAD add-in operative with the CAD client device and the CAD design application and configured to:
  receive a CAD file of an assembly drawing;
  analyze, based at least on part component definitions, the CAD file to extract part components located within the assembly drawing;
  add the extracted part components to a part component list of the assembly drawing, wherein the assembly drawing and part component list are displayable on a User Interface (UI);
  filter, based on a set of vendors sourcing the extracted part components, the part component list to identify specific vendors from the set of vendors sourcing one or more of the extracted part components or equivalent part components from the part component list;
  determine, from each of the identified specific vendors, an availability of each of the extracted part components from the part component list, wherein the availability is requested in a computer-based communication to a server of the identified specific vendors; and
  highlight, within the UI, the extracted part components for the identified specific vendors having availability of the extracted part components; and
 an order generator configured to:
  generate, based on the availability of the extracted part components, vendor-specific part component lists for at least one of the identified specific vendors with the availability;
  convert the vendor-specific part component lists to purchase orders; and
  communicate the purchase orders to a corresponding one of the identified specific vendors.

2. The system of claim 1, wherein the extraction of part components is performed in real-time as a part component is added to the assembly drawing.

3. The system of claim 1, wherein the extraction of part components is performed in batch-mode when the assembly drawing is completed.

4. The system of claim 1, wherein the extraction of part components further comprises matching the part components by any of:
 part number;
 equivalents of the part numbers;
 equivalents of the part component definitions;
 shape; or
 geometry.

5. The system of claim 1, wherein the part component list comprises any of: part numbers, part descriptions, quantities needed per assembly, number of assemblies, sizing, materials or CAD models.

6. The system of claim 1, wherein the filtering further comprises filtering based on any of:
 vendor-specific part naming conventions, pricing, availability, contractual obligations, preferred vendors, blocked vendors, historical performance or vendor geographic location.

7. The system of claim 1, wherein the filtering further comprises filtering based on:
 availability of custom fabricated part components from the part component list.

8. The system of claim 1, wherein the determining further comprises determining any of:
 pricing, accuracy of a description of the part components, sizing or materials.

9. The system of claim 1, wherein the purchase orders include any of: the part components, descriptions, sizing, quantities, pricing or time needed.

10. The system of claim 1, wherein the system further comprises a trained machine-learning model comprising:
 a first classifier to classify part definitions of the part components; and
 a second classifier to classify the part components based on the classified part definitions.

11. The system of claim 1, wherein the system further comprises a natural language processor configured to:
 analyze text of part definitions and determine one or more relationships between the part definitions and the part components.

12. The system of claim 1, wherein the conversion further comprises generating browser-based hyperlinks to complete a purchase of the part components from the corresponding one of the identified specific vendors.

13. A computer implemented method for processing a Computer-Aided Design (CAD) assembly drawing, the method comprising:
 receiving a CAD file of an assembly drawing;
 analyzing the CAD file to extract part components located within the assembly drawing;
 adding the extracted part components to a part component list of the assembly drawing wherein the assembly drawing and part component list are displayable on a User Interface (UI);
 filtering, based on a set of vendors sourcing the extracted part components, the part component list to identify specific vendors from the set of vendors sourcing one or more of the extracted part components or equivalent part components from the part component list;
 determining, from each of the identified specific vendors, an availability of the extracted part components, wherein the availability is requested in a computer-based communication to a server of the identified specific vendors, and
 highlighting, within the UI, the extracted part components for the identified specific vendors having availability of the extracted part components;

generating, based on the availability of the extracted part components, vendor-specific part component lists for each of the identified specific vendors with the availability;

converting the vendor-specific part component lists to purchase orders; and communicating the purchase orders to a corresponding one of the identified specific vendors.

14. The method of claim 13, wherein the analyzing the CAD file to extract part components located within the CAD assembly drawing further comprises:

comparing the CAD file to any of:
part component definitions;
part numbers;
equivalents of the part numbers;
equivalents of the part component definitions;
part shapes; or
part geometries.

15. The method of claim 14, further comprises:

continuously updating the part component definitions by requesting or receiving part component updates from the identified specific vendors sourcing a respective one of the part components.

16. The method of claim 15 further comprises identifying the part components in the CAD assembly drawing as parts that were previously sourced and determining an accuracy of the part component definitions.

17. The method of claim 16 further comprises identifying inaccurate ones of the part component definitions and notifying a corresponding vendor sourcing the respective one of the part components.

18. The method of claim 13, wherein the filtering further comprises:

filtering based on availability of custom fabricated part components from the part component list.

19. The method of claim 13, wherein the filtering further comprises filtering based on any of:

vendor-specific part naming conventions, part pricing, part availability, contractual obligations, preferred vendors, blocked vendors, historical performance or vendor geographic location.

20. A non-transitory computer-readable device having instructions stored thereon that, when executed by at least one computing device, cause the at least one computing device to perform Computer-Aided Design (CAD) operations comprising:

receiving a CAD file of an assembly drawing;

analyzing the CAD file to extract part components located within the assembly drawing;

adding the extracted part components to a part component list of the assembly drawing wherein the assembly drawing and part component list are displayable on a User Interface (UI);

filtering, based on a set of vendors sourcing the extracted part components, the part component list to identify specific vendors from the set of vendors sourcing one or more of the part components or equivalent part components from the part component list;

determining, from each of the identified specific vendors, an availability of the extracted part components, and highlighting, within the UI, the extracted part components for the identified specific vendors having availability of the extracted part components;

generating, based on the availability of the extracted part components, vendor-specific part component lists for each vendor with the availability;

converting the vendor-specific parts component lists to purchase orders; and communicating the purchase orders to a corresponding one of the identified specific vendors.

\* \* \* \* \*